(No Model.)
B. F. K. JENNINGS.
BEVERAGE SHAKING AND MIXING MACHINE.
No. 390,974. Patented Oct. 9, 1888.
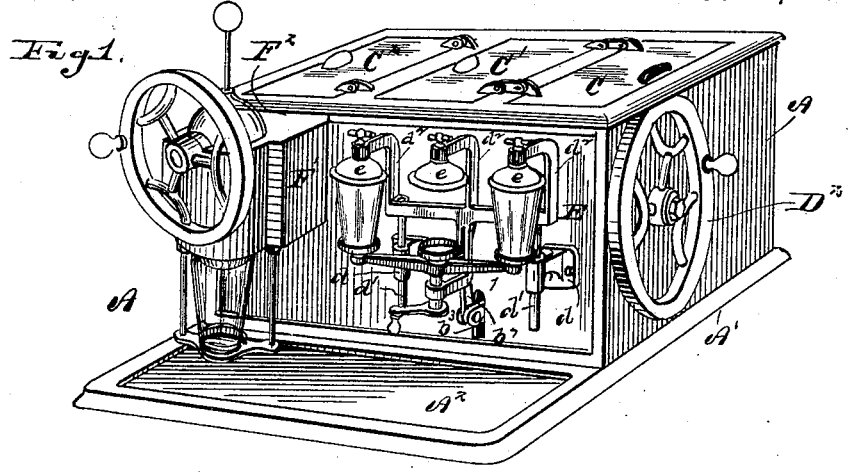
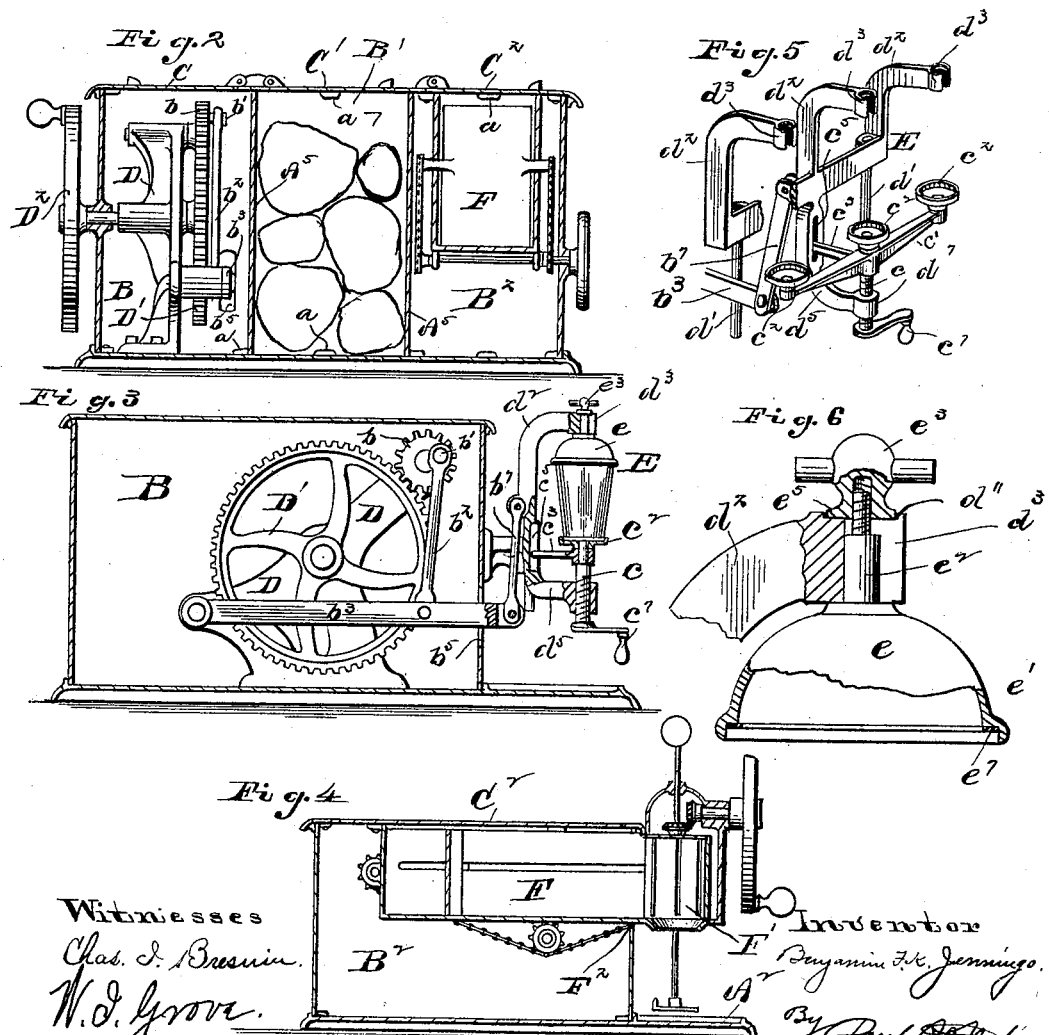
Witnesses
Chas. J. Bresnin.
W. J. Grove.
Inventor
Benjamin F. K. Jennings.
By Paul A. Staley
Atty.

UNITED STATES PATENT OFFICE.

BENJAMIN F. K. JENNINGS, OF SPRINGFIELD, OHIO, ASSIGNOR TO JOHN FOOS, OF SAME PLACE.

BEVERAGE SHAKING AND MIXING MACHINE.

SPECIFICATION forming part of Letters Patent No. 390,974, dated October 9, 1888.

Application filed April 2, 1888. Serial No. 269,303. (No model.)

*To all whom it may concern:*

Be it known that I, BENJAMIN F. K. JENNINGS, a citizen of the United States, residing at Springfield, in the county of Clark and State of Ohio, have invented certain new and useful Improvements in Beverage Shaking and Mixing Machines, of which the following is a specification.

My invention relates to improvements in beverage shaking and mixing machines.

The object of my invention is to provide a machine of novel construction adapted to perform the function necessary to produce the beverage known as "milk-shake."

My invention consists in the various constructions and combinations of parts hereinafter described and claimed.

In the accompanying drawings, Figure 1 is a perspective view of a machine embodying my invention. Fig. 2 is a transverse sectional view of the same, showing the arrangement of the driving mechanism of the milk-shake and the location of the ice-reservoir and the ice-shaving device. Fig. 3 is a longitudinal sectional view illustrating the manner of driving the shaking device. Fig. 4 is a longitudinal view showing the manner of inserting the ice-shaver into the casing. Figs. 5 and 6 are detail views of the receptacle-holding devices used in connection with the shaking mechanism.

Like parts are indicated by similar letters of reference throughout the several views.

In the said drawings, A A represent the main or outer casing of the device, which is preferably formed with the bottom A′, having an extended portion, A². The sides and ends of the casing are preferably made of separate pieces, having inwardly-projecting ears or projections $a$, through which the said parts are secured to the bottom A′ by means of screws, or in any other suitable manner.

The interior of the outer casing, A, is divided into three compartments, B, B′, and B², by partitions A⁵, secured to the top and bottom of the said casing in the manner above described. The top of the outer casing is provided with doors C, C′, and C², opening into the respective compartments B, B′, and B². In the compartment B is located the driving mechanism of the shaking device, which consists of a stand, D, on which is supported a gear-wheel, D′, located on the same shaft with a hand-wheel, D², which is placed on the outside of the casing, the said shaft being extended through the casing for this purpose. The gear D′ meshes with a pinion, $b$, having a crank-pin, $b'$, on one side thereof, which is connected by means of a pitman-connection, $b^2$, to the vibrating arm $b^3$, which is pivoted to the rear end of the stand D′. In front of the compartment B an opening, $b^5$, is provided, through which the vibrating arm $b^3$ is adapted to project.

Secured to the front face of the outer casing, A, are brackets $d$, having bearings for reciprocating rods $d'$ on the shaking frame E. This shaking frame E is provided with upwardly-extending standards $d^2$, each of which extends outwardly at the top, and is provided with an open bearing, $d^3$. Extending downwardly from the frame E is a bearing-support, $d^5$, also extending outwardly a corresponding distance with the standards $d^2$ and provided with a bearing, $d^7$. The bearing $d^7$ is bored out and screw-threaded and adapted to receive a screw-threaded stud, $c$, secured at its upper end to a cross-bar, $c'$, having receptacle-supporting stands $c^2$ in a direct line under the bearings $d^3$ on the frame E. Extending backwardly from the cross-bar $c'$, and in a line with the bearing-support $d^5$, is a projecting arm, $c^3$, the end of which has a bearing in the slotted opening $c^5$ in the bearing-support $d^5$. The upper end of the screw-threaded stud $c$ is secured to the cross-bar $c'$ in such a manner that the said stud may revolve therein, the lower end of the stud being provided with a crank-handle, $c^7$. Located in the bearings $d^3$, immediately above the receptacle-holding stands $c^2$, are caps $e$, each provided with an outwardly and downwardly projecting flange, $e'$, about its lower periphery, and with an upwardly-projecting stud, $e^2$, in the center of the top thereof. The stud $e^2$ is screw-threaded at the top and adapted to receive a thumb-nut, $e^3$, which screws thereon. Each of the bearings $d^3$ is provided at the top with a recess, $d^{11}$, into which the base $e^5$ of the thumb-nut is adapted to fit. The projecting stud $e^2$ is adapted to be inserted into the bearing $d^3$ through an opening in the front thereof, and is held firmly in position therein by tightening the thumb-nut in the recess $d^{11}$. The cap $e$, however, may be readily removed by loosening the thumb-nut sufficiently to permit the base of the thumb-nut to be raised out of the recess $d^{11}$, when the stud may be withdrawn laterally from the bearing $d^5$.

A connection is formed from the end of the vibrating arm $b^3$ to the shaking frame E by the pitman-connection $b^7$, so that, as will now be seen, a revolution of the hand-wheel $D^2$ conveys a reciprocating motion to the shaking frame E, having rods $d'$. The glass or other receptacle is placed upon a receptacle-holding stand, $c^2$, and by turning the crank $c^7$ is forced into a cap, $s$, above the same, the said cap being preferably provided in the flange $e'$ with a suitable packing-ring, $e^7$. In the compartment $B^2$, I provide an ice-receiving chamber, F, located within the casing A, and a cutting-chamber, F', located without the casing A A. The chamber F and the cutting-chamber F' are preferably formed in a single piece independent of the casing A, and are inserted into said casing through an opening, $F^2$, formed in the front of said casing, the said casing or receiving-chamber being secured in position by lugs and screws, as above described, for the walls or partitions of said casing.

I have shown three receptacle-holding stands and a corresponding number of standards and caps on the shaking frame E. This is the number preferably used, as by this construction one, two, or three glasses or other receptacles may be held therein at one time. If one glass of the beverage is to be prepared, it is placed in the central stand; if two glasses, they are preferably placed in the outer stands; if three glasses, one is placed in each. It is obvious that a greater or less number may be used, if desired.

The central compartment in the casing A is used for an ice-reservoir, in which the ice used for cooling the beverage may be stored, and thus prevent the same from melting in the ice-receiving chamber of the shaver and running through the cutting-chamber onto the forward or extended portion, $A^2$, of the casing. The forward portion, $A^2$, is preferably extended beyond all the operating parts of the shaver and the shaker, and is adapted to receive and support the glasses or other receptacles while the ingredients of the beverage are placed therein.

By this construction it will be seen that a machine of neat and substantial construction is formed, in which all of the operating parts are inclosed.

By the use of the ice-shaver and the ice-receiving chamber a separate machine for shaving the ice, which forms one of the ingredients of the beverage, is obviated, and all the parts are placed compactly within small compass.

Having thus described my invention, I claim—

1. In a milk-shake, the shaking frame having the outwardly-extending curved standards provided with open bearings and the lower extended bearing-support having a screw-threaded stud and carrying receptacle-stands, caps in said open bearings, a projecting arm from said receptacle-stands resting in a slotted opening in said bearing-support, and means, substantially as described, for revolving said screw-threaded stud, the parts being combined as set forth.

2. The adjustable receptacle-holding stand, the upwardly-extending curved support provided with an open bearing therein in line with said receptacle-holding stand, a cap having a projecting stud adapted to be supported in said bearing, and a recessed thumb-nut adapted to screw onto said stud and hold the same in position, the parts being combined substantially as set forth.

3. The combination, with a supporting-stand having a gear-wheel and pinion journaled thereon, a vibrating arm connected to said pinion by a suitable crank-and-pitman connection, of a shaking frame composed of two parts carrying, respectively, the receptacle-stands and upper removable covers, a screw-threaded stud connecting said parts adapted to draw together or separate the same, and a connection from said vibrating arm to said shaking frame, substantially as specified.

4. The outer casing having the supporting-brackets thereon, the reciprocating rods in said supporting-brackets, the shaking frame on said reciprocating rods, said frame being provided with the upwardly and outwardly extending curved standards having the open bearings therein, the screw-threaded stud supported in a bearing on said frame, and a cross-bar on the top of said stud, receptacle-holding stands on said cross-bar in line with said open bearings, and removable caps supported in said open bearings, the parts being combined substantially as and for the purpose set forth.

In testimony whereof I have hereunto set my hand this 29th day of March, A. D. 1888.

BENJAMIN F. K. JENNINGS.

Witnesses:
PAUL A. STALEY,
BRUCE CHORPENING.